Patented Aug. 14, 1945

2,382,731

UNITED STATES PATENT OFFICE 2,382,731

ADHESIVE

Julius G. Little, Wilmington, Del., assignor to Hercules Powder Company, Wilmington, Del., a corporation of Delaware No Drawing. Application September 26, 1942, Serial No. 459,831

3 Claims. (Cl. 260—755)

This invention relates to adhesive compositions and more particularly it relates to pressure-sensitive adhesive compositions.

In preparing pressure-sensitive compositions of the type in wide use on masking tapes and adhesive tapes, the manufacturer strives to produce a composition which will not dry out and harden upon aging and upon exposure to air. The adhesive composition must be chemically stable and there must be no separation of components as by sweating or evaporation.

At the same time, a product which has a maximum power to adhere both to the tape and to the object to which the tape is applied is desired. In addition, there is required a composition which has maximum cohesive strength and which has a greater affinity for the tape than for objects to which the tape is applied. The last mentioned properties are necessary in order to obtain a "clean break" and to avoid leaving portions of adhesive composition behind on the object to which it was applied when the tape is removed.

Adhesive compositions are commonly made from a rubber-rosin base. Various additions and modification have been made in this base in attempts to improve aging qualities, adhesive strength, and cohesiveness. However, in most cases a modification which improves the desirability of the composition in one way has been found to impair it in another way. The desired combination of high adhesiveness with high cohesiveness and the ability to make a clean break in stripping has not been obtained.

Now in accordance with this invention, it is possible to produce a satisfactory tacky pressure-sensitive adhesive composition which has excellent aging properties, possesses great adhesive strength and has pronounced cohesive strength together with a pronounced affinity for cellulose tapes to which it is applied. Adhesives of this nature are prepared from a base of a rubber, mixed with a diethylene glycol, triethylene glycol or other glycol ester of a rosin treated so as to reduce the oxygen absorption tendencies of the rosin acid groups therein. Usually it will also be desirable to include in the base a small amount of filler such as zinc oxide.

Having indicated in a general way the nature of this invention, the following examples are given to illustrate specific embodiments thereof. Parts are by weight.

Example I

A pressure-sensitive adhesive composition was prepared using 160 parts of a monoethylene glycol ester of hydrogenated rosin, (acid number 15, drop melting point 55° C.) 160 parts of crepe rubber, and 125 parts of zinc oxide. These ingredients were made into an adhesive composition in the following manner:

The rubber was first broken down by milling on a two-roll mill at 50° C. for a period of 38 minutes. The monoethylene glycol ester of hydrogenated rosin was then added and milling continued for 10 minutes. After adding the zinc oxide, the milling was continued for 12 additional minutes. To 400 parts of the resulting adhesive was added 1100 parts of carbon tetrachloride, this mixture being tumbled for a period of 48 hours to achieve homogeneity. The tumbled solution was applied to a white cambric cloth backing using a doctor blade in such a manner as to give an adhesive coating 0.02 inch thick. This coated tape was then allowed to age for a period of 8 days to allow the solvent to escape. The resulting coating was tacky, mere pressure without aid of heat or solvents serving to make a strongly adherent bond.

After aging, the tape was tested on a Scott testing machine for its adhesive characteristics. The method used followed the broad outline of "Federal specifications for plaster; adhesive, surgical," U-P-401, June 30, 1936. What was actually measured was the pounds tension required to strip the tape from two Bakelite chips which were firmly held by the jaws of the testing machine. These Bakelite chips were connected by a strip of the adhesive being tested. The tape was conected in such a manner that the portion of tape between the 2 chips was 2 cm. by 10 cm. and a portion of the tape, 2 cm. by 4 cm. was stuck to each chip. A series of tests showed 19 to 23.5 pounds tension was required to strip the tape from the chips.

Example II

Another adhesive was prepared in a manner simliar to that used in Example I, except that here in place of monoethylene glycol ester of hydrogenated rosin, an equal amount of diethylene glycol ester of hydrogenated rosin (acid number 14, drop melting point 43° C.) was used, the ingredients being:

| | Parts |
|---|---|
| Diethylene glycol ester of hydrogenated rosin | 160 |
| Rubber | 160 |
| Zinc oxide | 125 |

Adhesion tests as in Example I showed 15–16 pounds necessary to break the bond.

*Example III*

An adhesive was prepared in the same manner as in Example I, but here the ingredients used were:

| | Parts |
|---|---|
| Triethylene glycol ester of hydrogenated rosin (acid number 16) | 160 |
| Rubber | 160 |
| Zinc oxide | 125 |

*Example IV*

A composition was prepared using the same method and ingredients used in Example III, but here the proportions of the ingredients were altered. The proportions of ingredients which were used were:

| | Parts |
|---|---|
| Triethylene glycol ester of hydrogenated rosin (acid number 15) | 240 |
| Rubber | 80 |
| Zinc oxide | 125 |

This adhesive was quite soft and illustrates the softest composition practical for coating on tapes.

*Example V*

A composition was prepared using the same method and ingredients used in Example III, but here the proportions of the ingredients were altered. The proportions of ingredients which were used were:

| | Parts |
|---|---|
| Triethylene glycol ester of hydrogenated rosin (acid number 16) | 80 |
| Rubber | 240 |
| Zinc oxide | 125 |

This adhesive was quite firm and illustrates an adhesive in which tackiness is below maximum but cohesion is very high.

*Example VI*

A fifth adhesive composition was prepared in a manner similar to the others, but here the glycol ester was prepared from Hyex rosin rather than hydrogenated rosin. The ingredients used were:

| | Parts |
|---|---|
| Diethylene glycol ester of Hyex rosin (acid number 14, drop melting point 42) | 160 |
| Rubber | 160 |
| Zinc oxide | 125 |

The compositions prepared in Examples II–V were all tacky at normal temperatures (15–30° C.) and all displayed high adhesive qualities.

The particular modified rosin ester utilized in compositions according to this invention may be prepared by esterification with any glycol. Thus, for example, esters which imparted the desired adhesive properties were prepared from trimethylene glycol, tetramethylene glycol, etc., monoethylene glycol, diethylene glycol, triethylene glycol, tetraethylene glycol, hexaethylene glycol, etc.; monopropylene glycol, diphopylene glycol, tripropylene glycol, etc.; butylene glycol, dibutylene glycol, tributylene glycol, etc. The polyethylene glycols are preferred as providing maximum combined softening and adhesive properties.

The rosin acid group of the ester used may be that of any wood or gum rosin acid which has been treated in such a way as to reduce its oxygen absorption tendencies. It has been found that the oxygen absorption tendencies of rosin acids are reduced by treating them in such a way as to reduce their apparent unsaturation. Rosin acids which have had their apparent unsaturation reduced and therefore may be used in preparing glycol esters used in accordance with this invention are rosin acids which have been completely or partially hydrogenated by any of the methods well known to the art; or those rosin acids which have been dehydrogenated and are characterized by an appreciable proportion of dehydrogenated rosin acid groups; or those rosin acids which have been subjected to a disproportionation treatment or a "Hyex" reaction (described in Littmann U. S. Patent 2,154,629) such as those well known to the art. It will be appreciated the rosin acid may be in the form of an ordinary rosin or in the form of a more concentrated rosin acid extracted therefrom, i. e., abietic acid, pimaric acid, etc. Both hydrogenated rosin and dehydrogenated rosin are of a molecular configuration characterized by greatly decreased apparent unsaturation and decreased oxygen absorption values. Treatments reducing the apparent unsaturation of the rosin acid group may be applied to the rosin acid prior to esterification or they may be applied to the glycol esters of the rosin acid. The treated rosin, rosin acid, or ester thereof is characterized by a thiocyanate number below 60, usually below 30, as compared with 90–100 for rosin; and an oxygen absorption of less than 2% when subjected to oxygen at 300 pounds per square inch pressure for 162 hours at 25° C. as compared with oxygen absorptions of 4–8% for ester gum and 8–9% for rosin.

Ordinarily, common or hevea rubber in the form of crepe, smoked sheet, latex, etc. is suitable for the adhesive composition; white crepe rubber is preferred. However, low grade rubbers including the various guttas, for example, balata, gutta percha, gum tuno, namaqualand rubber, abba rubber, enphorbia gum, gutta penang, etc. may be used. Similarly, synthetic rubbers, which may be any material of a polymeric nature having toughness and resilience approximating ordinary rubber, and which are compatible with the glycol esters, for example, polymers and copolymers based on butylene, butadiene, butadiene derivatives, acrylic compounds, vinyl compounds, etc., are suitable. The term "a rubber" as used herein and in the claims will be understood to refer to any of these rubber-like materials.

It is not essential that the resin ingredient be entirely composed of a glycol ester of a low oxygen absorption rosin. The glycol ester may be adultered with small amounts of unmodified rosins or rosin esters. Some of the desirable effects of this invention will be imparted to adhesives in which as little as 50% of the resin content is the resin prepared in accordance with this invention. It is, of course, to be understood, however, that the best adhesives will be those in which the largest proportion of the resin used is a glycol ester of rosin prepared in accordance with this invention.

The pressure-sensitive compositions prepared in accordance with this invention may contain anywhere from about 15 to about 70% of the glycol ester, and about 15 to about 80% of the rubber or rubber-like ingredient. The quantity of glycol ester is determined by the softness and degree of tack desired and by the initial softness of the rubber-like base compounded therewith. Using rubber (ordinary hevea type) the ratio of glycol ester to rubber will be between about 40:60 and about 75:25 for adhesives most useful for scotch tape, adhesive tape, masking tape, and the like.

Where desired, adhesive compositions prepared in accordance with this invention may contain fillers. Fillers other than the zinc oxide used in the examples may be employed. Thus, for example, barium sulfate, antimony oxide, lithopone, clay, chalk, and other similar fillers have been used. These fillers are not at all essential to the adhesive compositions in which they are used; they are usually employed in a quantity less than impairing adhesion as their use lowers the cost of the composition. It will usually not be found practical to include fillers in excess of about 45% by weight of the entire nonvolatile contents of the adhesive composition, 20–30% being normally suitable.

Waxy substances may also be included in compositions prepared in accordance with this invention. For example, paraffin, carnauba wax, japan wax, stearic acid, cetyl alcohol, stearyl alcohol, montan wax and the like, may be included. Waxes serve the purpose of increasing the ease of application of the adhesive in the molten form in manufacturing adhesive tapes and sheets. The amount of wax used in compositions prepared in accordance with this invention will in general not exceed 20% by weight of the nonvolatile components since the wax tends to decrease the tackiness of the composition.

In adhesive compositions not containing a glycol ester of a rosin acid of reduced unsaturation, the desired high degree of tackiness is obtained by including a softener in the adhesive composition. When glycol esters, are used in accordance with this invention, a high degree of tackiness is obtained without the use of softeners. Hence softeners may be omitted altogether. Inclusion of materials such as mineral oil, lanolin, dibutyl phthalate and the like is not precluded where particular effects are desired, but if used, such softeners will be in small amount as compared with quantities found necessary in rubber-rosin bases.

The compounding of the pressure-sensitive compositions in accordance with this invention may be accomplished in a variety of ways. Thus, they may be compounded by milling their ingredients on a roll mill or in a heavy duty mixer such as a Banbury mixer, by dissolving the ingredients in a common solvent, by melting the ingredients together, or by any combination of these methods. If the compounding is accomplished by milling, the rubber is first broken down and then the remainder of the ingredients are added, either separately or as a mixture. The milling operation is preferably carried out at temperatures of 50° C. to 80° C., but temperatures of 30° C. to 250° C. are operable. If the ingredients are compounded by dissolution, they are mixed and added to a solvent such as benzene, toluene, carbon tetrachloride, etc. The dissolution is expedited by agitating or heating of the mixture. In this operation any solvent or mixture of solvents may be used provided all the ingredients of the adhesive composition, with the exception of the fillers, are soluble therein. If the composition is compounded by melting the ingredients together, temperatures within the range of 120° C. to 200° C. are operable, but temperatures within the more limited range of 80° C. to 135° C. are preferred.

After preparing the adhesive composition by one of the methods outlined above, it may be applied to a suitable base sheeting. Preferably the sheeting material will be prepared from cellulose or a cellulose containing material in order to utilize the affinity of the glycol ester-rubber composition for cellulosic materials. The application of the adhesive composition to the sheeting material may be accomplished by spreading in the molten state, by calendering in the semi-molten state or by coating in the form of solutions in solvents such as, for example, benzene, toluene, butyl acetate, and carbon tetrachloride, or by coating of aqueous emulsions or dispersions.

Adhesives prepared in accordance with this invention produce adhesive tapes which do not leave surfaces to which they have been applied in an objectionable state of stickiness. The composition of a rubber and glycol ester of rosin acid of low unsaturation in accordance with this invention have a strong affinity for cellulose and cellulose derivatives. Although the cause of the affinity is not known, the result is a very desirable one of practical advantage in preparing adhesive tapes. When adhesive compositions containing the glycol ester are applied to a paper, regenerated cellulose, cellulose derivative (i. e., cellulose acetate, ethyl cellulose, etc.), or cloth backing to prepare a masking, mending, or surgical tape, the composition co-acts with the cellulose backing to form a bond stronger than for surfaces against which it will normally be used. Thus, upon removal of the tape in use, the adhesive composition will not separate from the cellulosic backing to remain on the surface to which the tape was applied.

The adhesive compositions and adhesive sheetings prepared therewith in accordance with this invention have the advantage of high stability and age resistance. The rosin acid groups do not absorb oxygen and do not serve as oxygen carriers which might speed oxidation of the rubber. Tack is thus retained. In addition, the glycol esters of rosin acids of reduced unsaturation induce a very high state of tackiness without additional softening agents which are normally essential for high tack. The elimination or reduced use of softening agents is an advantage in that the usual softeners such as the various monohydric alcohol esters are distillable substances with sufficient vapor pressure to evaporate slowly. Also, in many cases softeners sweat out in time because of their high fluidity. In addition, softeners tend to cause the adhesive composition to become mushy or stringy and to be less cohesive in quantities needed for tack. By eliminating or minimizing the use of additional softeners, maximum cohesive strength is obtained.

What I claim and desire to protect by Letters Patent is:

1. An adhesive tape comprising a cellulosic sheeting coated with a tacky, pressure-sensitive adhesive composition consisting of about 160 parts triethylene glycol ester of hydrogenated rosin, about 160 parts rubber, and about 125 parts zinc oxide.

2. An age-resistant, cohesive, tacky, pressure-sensitive adhesive composition consisting of about 160 parts triethylene glycol ester of hydrogenated rosin, about 160 parts rubber, and about 125 parts zinc oxide.

3. An adhesive tape comprising a cellulosic foil coated with a tacky, pressure-sensitive adhesive composition consisting of about 160 parts triethylene glycol ester of hydrogenated rosin, about 160 parts rubber, and about 125 parts zinc oxide.

JULIUS G. LITTLE.